Figure 1:
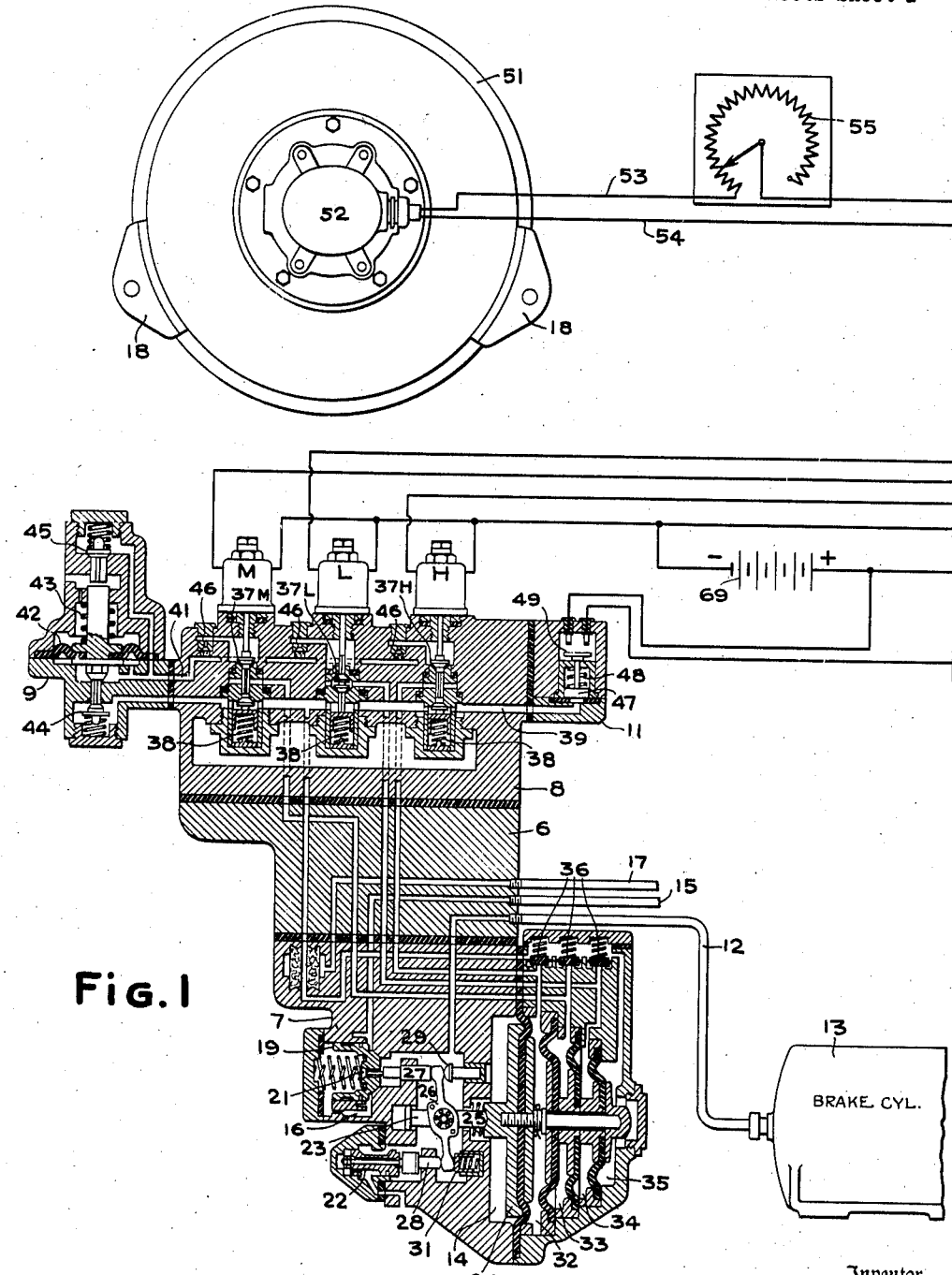

June 20, 1944.  E. C. VROMAN  2,351,724
AIR BRAKE
Filed June 11, 1942  2 Sheets-Sheet 2

Inventor
Erwin C. Vroman

Dodge
Attorneys

Patented June 20, 1944

2,351,724

UNITED STATES PATENT OFFICE 2,351,724

AIR BRAKE

Erwin C. Vroman, Watertown, N. Y., assignor to The New York Air Brake Company, a corporation of New Jersey Application June 11, 1942, Serial No. 446,654

10 Claims. (Cl. 303—21)

This invention relates to railway brakes and particularly to brakes for high speed trains of the type in which a generator driven at axle-speed and having an approximately straight line speed-voltage characteristic actuates a plurality of electric relays serially to condition a pneumatic relay to give different braking ratios appropriate to different corresponding speed ranges. While this scheme of control may be variously applied, there are two systems in general commercial use embodying this type of control, and the invention is applicable to each of them.

In the system which is chosen for detailed description as a basis for the disclosure of the invention, each car in the train is equipped with a speed responsive unit. The other system uses two speed responsive units per train, regardless of the number of cars.

Since more than one speed responsive unit is used in a single train in both embodiments, harmonious brake action throughout the train requires that the speed responsive units have similar, and as nearly as practicable, identical characteristics. The control exercised upon the brakes of the various cars must be approximately uniform. Otherwise there will be objectionable slack action.

This condition is readily attained in a new train in which all of the wheels are of the same size, but because of wheel wear and the necessary truing and replacement of wheels from time to time, a condition develops in which the diameters of generator-driving wheels are not uniform. For a typical example, on one train to which the control has been applied, the wheels when new are 36 inches in diameter, but wheels are not scrapped until their diameter has been reduced to 33 inches. The rotary speed of a 33 inch wheel is about 9% greater than that of a 36 inch wheel for the same train speed. In the absence of some compensating adjustment, variations up to 9% would result in an undesirable condition where two or more speed responsive devices are active in a single train.

The three speed-responsive relays used in each control are set to pick up and drop at definite generator voltages. To control these operating characteristics, two related resistance adjustments have been applied to the winding of each relay. The prescribed practice in the past has been to make these six resistance adjustments each time the wheel diameter was materially changed. This practice was actually more theoretical than real, because the adjustments, if properly made, will require considerable time, and in some cases were not even attempted, though needed.

The present invention is based on the concept that, if the resistances of the various relays and the adjustable resistances associated therewith are properly coordinated, it is possible to interpose in the generator circuit an adjustable and preferably non-inductive master resistance which will correct for differences of generator speed caused by permissible differences of wheel diameter; and still not distort, as among themselves, the individual resistance adjustments of the relays.

Thus it becomes possible to secure a single reasonably accurate correction—one more accurate than is likely to be attained under operating conditions by making six individual adjustments. By calibrating the adjustable element of the master resistance in terms of wheel diameter, the adjustment is direct and may be made by first intention. All that is then necessary is to measure the wheel diameter and set the indicator on the calibrated dial to that diameter.

This simplicity of maintenance adjustment makes it commercially practicable to devote particular care to the initial adjustment of the various relays, for the reason that once controlling resistances have been standardized, they will rarely be touched. The only necessary adjustment is offered by the single adjustable master resistance in the main circuit. While it is technically possible to eliminate the local adjustments of resistance, as a practical matter it is preferred to retain them.

The desirability of using a non-inductive master resistance is more pronounced in those special cases in which the brake controlling mechanism includes what is known in the art as an "anti-slide feature." No such device is here illustrated, for the reason that it would materially complicate the drawings without affecting the broad principle of the invention. The important point is merely that the presence of known anti-slide devices sometimes used in systems of the type mentioned does not inhibit the use of the invention provided the master resistance is non-inductive.

The invention will now be described as embodied in a brake control for a single car, intended to be used in trains with other cars, preferably similarly equipped. The control equipment, where two controls are used with an intervening train circuit, are the same. Pneumatic relays with their magnet valves are connected to the train circuit and increase the load on the relay switches which directly control the magnet valves. Hence, these switches are equipped with arc-suppressors of conventional form but the operation of the relays is unchanged.

In the drawings—

Figure 1A:
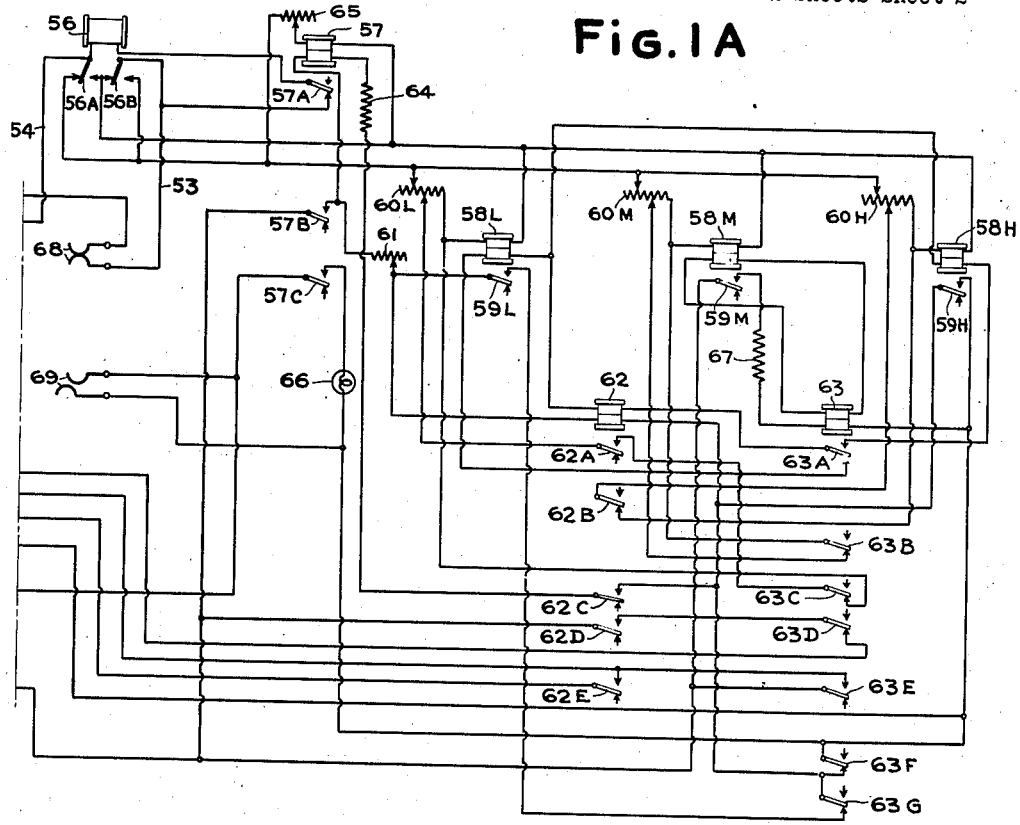

Fig. 1 on sheet 1 and Fig. 1A on sheet 2 when assembled in that order from left to right form a diagram of the control mechanism for a single car.

Figure 2:
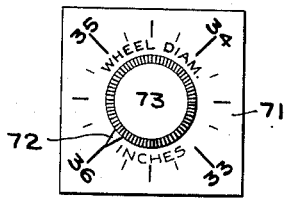

Fig. 2 is a face view of the calibrated dial and adjustment knob of the master resistance.

Refer first to Fig. 1.

The pipe bracket 6 carries the body 7 of the pneumatic relay and the body 8 of the magnet valve portion. On the body 8 is mounted the inshot valve body 9 and the body 11 of the so-called "K-3" switch whose function here is to energize the electric control circuits when (and only when) pressure is developed in the control pipe.

Connected to body 6 are all the pipes connecting the pneumatic relay with components of the air brake system. The brake cylinder pipe 12 connects the brake cylinder 13 with the brake cylinder chamber 14 of the pneumatic relay. The supply pipe 15 supplies braking air to brake cylinder 13 from any suitable source, ordinarily the "supply reservoir" (not shown) which may be charged in any known manner. The pipe 15 is connected by a passage with the supply chamber 16 of the pneumatic relay.

The control pipe 17 is the pipe in which pressure is developed to apply the brakes. It could be a straight air brake pipe, but usually is the control pipe leading from an automatic brake controlling valve device, such for example as a D-22 control valve.

The brake cylinder 13 typifies means to operate all the brake shoes on the car, and applies the brakes when the cylinder is under pressures controlled by the pneumatic relay. Two such brake shoes appear at 18 but no brake rigging is illustrated, since it is conventional and subject to wide variation of form.

The relay is of the known four-ratio type. Between supply chamber 16 and brake cylinder chamber 14 is the inlet valve 19 with pilot valve 21. The valve 22 controls exhaust from chamber 14 to atmosphere. Push rod 23 carries thrust plate 24 and is biased to the right by spring 25 whose thrust is equivalent to about 7 pounds per sq. in. pressure in chamber 14.

This rather heavy spring is used to ensure free releasing movement, and the inshot valve in body 9 is used to assure a countervailing initial inshot to neutralize the effect of the spring when an application is started. This will be further explained.

The push rod 23 carries the pivoted cross arm 26 which reacts at its opposite ends on inlet valve push rod 27 in a valve opening direction and the exhaust valve push rod 28 in a valve closing direction. A stop 29 and a spring plunger 31 are used as indicated, to ensure that the exhaust valve will close before the inlet valve opens, and in reverse motion the inlet valve will close before the exhaust valve opens.

A pile of four flexible diaphragms is used forming four control chambers 32, 33, 34 and 35 in which control pipe pressure may act as determined by the magnet valve portion. When control pipe pressure acts only in chamber 35, the resulting pressure in chamber 14 and brake cylinder 13 is 40% of that in the control pipe. When it acts in 35 and 34, the ratio is 60%. When it acts in 35, 34 and 33 it is 80% and when it acts in all four it is 100%. The percentages stated are controlled by the relative areas of the diaphragms and are merely illustrative of suitable values. Release check valves 36 permit direct release flow to the control pipe from chambers 32, 33 and 34 while 35 is always open to the control pipe.

On the bracket 8 are three windings M, L and H (signifying "medium," "low" and "high" as defining the relative train speeds at which they become energized). Each winding when energized shifts downward a corresponding double beat valve 37M, 37L, 37H against the upward bias of springs 38. The valve 37L is reverse acting with respect to 37M and 37H and all three serve to connect related chambers 33, 34 or 32 selectively with the passage 39 which is in free communication with control pipe 17 or passage 41 which is controlled by the inshot valve, so as to be subject to 7 pounds pressure and no more, when the control pipe is under pressure.

The inshot valve in housing 9 comprises a flexible diaphragm 42 biased downward by spring 43 and urged upward by pressure in passage 41. The diaphragm in upward motion permits closure of the spring urged check valve 44 to stop flow from passage 39 (control pipe pressure) to passage 41. This occurs when pressure in passage 41 reaches seven pounds per sq. in. If the diaphragm should over-travel because of higher pressure in passage 41, it opens relief check valve 45. Chokes indicated at 46 limit the flow rates from passage 41 to the valves 37M, 37L and 37H.

The K-3 switch in housing 11 comprises a piston 47 subject to control pipe pressure in passage 39, and biased by a light spring 48 to hold contactor 49 in circuit breaking position, except when the control pipe 17 is under pressure. The switch closes as soon as control pipe pressure rises a few pounds.

The effect of the controls is as follows:

L energized, M and H de-energized; chamber 35 connected with control pipe; establishes 40% relay ratio.

L, M and H de-energized; chambers 35 and 34 connected with control pipe; establishes 60% relay ratio.

M energized, L and H de-energized; chambers 35, 34, 33 connected with control pipe; establishes 80% relay ratio.

M and H energized, L de-energized; all chambers connected with control pipe; establishes 100% relay ratio.

Observe that if the electric connections fail, the second (60% relay ratio) condition will be established. The braking ratio with 60% relay ratio conforms to that established where no speed control is used, say 150% braking ratio. On this basis 100% relay ratio gives 250% braking ratio.

Because of the inshot valve connection through port 41, all chambers are charged together to seven pounds at the start of an application, so that the effect of spring 25 is neutralized immediately an application starts.

One of the wheels of the car indicated at 51 drives an electric generator 52. This generator is of the direct current type preferably having substantially a straight line speed-voltage characteristic. It supplies current for the operation of a relay system which controls the supply of current from a suitable source of constant potential, such as a battery 69, to the magnet valves of the pneumatic relay. The operation of this relay system is dependent upon maintenance of a fixed polarity of the current supplied by the generator. Consequently, two relays are provided to control the connections to the relay system in such manner as to take care of reversals in the polarity of the current supplied by the generator when the direction of car travel is changed. These two relays always assume a position in which the current delivered to the circuits they control is of fixed polarity.

Briefly stated, the electric control system embodies not only the polarized directional relay 56 and a directional repeater relay 57, but also three speed responsive relays 58L, 58M and 58H corresponding to the windings L, M and H of the magnet valves associated with the pneumatic relay. Associated with the relays 58L, etc. are two other relays 62 and 63 which are designated secondary relays and cooperate in the control of the windings L, M and H in a manner which will be described subsequently.

The polarized relay 56 is the main directional relay and has two armatures 56A and 56B each of which has front and back contacts. Since this relay is of the polarized type, the contacts remain closed on either front or back contact and can be shifted only by a reversal of current. The directional relay shifts its contacts each time the polarity of the generator changes as a result of a change in direction of travel of the car.

The directional repeater relay 57 has two windings as indicated, and three armatures, namely 57A, coacting with a back contact, 57B coacting with a front contact, and 57C also coacting with a front contact.

The function of this repeater relay 57 is to cut the sensitive directional relay 56 out of circuit after it has effected the necessary reversal and before it has become over-energized.

The current flow through the upper winding of this relay may be adjusted to suitable value by variable resistance 65; a fixed resistance 64 limits the current flow through the lower winding.

The three speed-responsive relays are of the type including two windings as indicated in the drawings. The designations 58L, 58M and 58H indicate their range of response, as low, medium and high speeds respectively. Each relay has a single armature 59L, 59M and 59H respectively. These coact in each case with a corresponding front contact. Associated with the uper winding of each of the relays 58L, 58M and 58H are corresponding ones of three resistances 60L, 60M and 60H. Each of these has two slide adjustments, the upper one of which, as viewed in Fig. 1A, serving to adjust the maximum resistance in circuit with the associated relay, and the lower one serving to determine the portion of this maximum resistance which is shunted out of circuit to cause the relay to drop its armatures at voltages close to those at which it picks them up.

An adjustable resistance 61 limits the current flowing to the two secondary relays 62 and 63. Each of the secondary relays has two windings connected in individual circuits as will appear below, and the contacts of those relays control circuits involved in the operation of the pneumatic relay. The contacts of the relays 62 and 63 are designated 62A, 62B, etc., and 63A, 63B, etc.

It will be understood of course that the K—3 switch in the housing 11 closes as soon as a brake application starts. Thereupon the directional relays function, and condition the speed control relays to operate serially. How many of them will operate in any particular application depends on how high the speed of the train is at the time the application starts.

To permit tracing the operation, an impossible condition will be assumed, namely, that the K—3 switch is closed and that the train is slowly increasing in speed. This assumes that the brakes do not apply, which is contrary to fact, but the assumption makes it simpler to trace the sequential operations of the relays.

Assume that the vehicle moves in a forward direction and the current from the generator 52 flows through wire 54, thence through the winding of relay 56, contactor 57A of relay 57, wire 53, test jack 68 and adjustable master resistance 55 back to the generator. The directional relay 56 is assumed to be so designed that under these conditions its contactor will close against the left hand contacts, as shown. It will remain thereafter in this position until the current is reversed.

When the relay 56 is so energized, current from the generator will flow through the wire 54, contactor 56A of relay 56, resistor 65, upper winding of relay 57, contactor 56B, test jack 68, master resistance 55, and wire 53 to the other side of the generator. When the vehicle attains a moderate speed, say 8 miles per hour, the current flowing through the upper coil of relay 57 will energize that relay to open the circuit of relay 56 at 57A, protecting the relay against over-energization and reducing the load on the generator.

At the same time current from the generator 52 will flow through wire 54, contactor 56A, resistor 60L, upper coil of the low speed relay 58L, contactor 56B in the position shown, and thence to the generator by way of the jack 68, wire 53 and master resistance 55. Similarly, there are parallel circuits through the resistor 60M and the upper winding of relay 58M as well as through the resistor 60H and the upper winding of the relay 58H. Thus all three of the speed governor relays are in circuit with the generator so that they will pick up and drop their contacts at their proper speeds. The speeds at which each picks up and drops its contactor can be set precisely by adjusting the two sliders on the corresponding resistors 60L, 60M and 60H as the case may be.

When the relay 57 picks up, the contactor 57C places the indicating lamp 66 in circuit with the battery 69, the lighting of the lamp serving to indicate that the generator 52 is operating properly. The closure of the contactor 57B places the lower coil of relay 62 in circuit through the resistor 61, closing its front contacts and causing contactor 62D to energize the low speed winding L, thus conditioning the pneumatic relay to develop 40% braking force. The circuit includes the contactor 62D and contactor 63D which at this time is against its back contact, the relay 63 not being excited.

The circuit is from the positive terminal of battery 69 through contacts 49 of the K—3 switch, contact 62D of relay 62, back contact 63D of relay 63, winding L of the pneumatic relay to the negative terminal of the battery. This circuit can be broken either by dropping of relay 62 or pickup of relay 63.

When a train speed of approximately 22 miles per hr. is reached, the generator current is sufficient to cause the relay 58L to pick up its contactor 59L. This establishes a short circuit around the relay 62 which thereupon drops its contactors. The resistance 61 limits the flow of current from the battery to a suitable value. When the relay 62 drops its contactors, circuits are opened at 62A, 62C, 62D and 62E, whereas 62B closes against the back contact. The effect of opening the contactor 62D is to deenergize the low speed winding L and since the other windings M and H are then deenergized, the effect is to establish 60% of the maximum braking force.

It will be observed that dropping of the contactors 62A eliminates the short circuit around a portion of the resistor 60L and in effect increases the resistance in series with the upper winding of relay 58L. The effect is to render the relay more sensitive to reduction in speed. The increase of resistance is such as to cause the relay 58L to open when speed falls below 20 miles per hour.

When the relay 62 is deenergized, an inductive impulse is generated momentarily in the upper coil of the relay and this is effective to excite the lower coil of relay 58L with which it is in circuit over the back contact of relay 63. The effect is to assist the relay 58L in holding its contactor closed.

When the vehicle speed exceeds approximately 43 miles per hour the current flow is sufficient to cause the relay 58M to lift its contactor 59M. This causes battery current to flow from the positive terminal of the battery via contact 59M, resistor 67, the lower coil of relay 63 to the negative terminal of the battery. The relay 63 consequently picks up its contactors. Voltage induced in the upper coil of relay 63 is effective in the lower winding of relay 58M to ensure retention of its contactor. Battery current now flows from the positive terminal through contactor 63E to energize the medium speed winding M which results in the development of 80% of the braking force.

Contactor 63B opens its circuit when it is lifted and the effect is to increase the resistance in series with the upper winding of relay 58M. The increase in resistance is such as to ensure that the latter relay will drop its contactors if the speed falls below 40 miles per hour.

When the vehicle speed rises above 69 miles per hour the generator develops sufficient voltage to cause the relay 58H to pick up its contactor. The closing of contactor 59H against its front contact completes the circuit from the resistor 61 through the lower winding of relay 62 and contactor 59H and thence to the battery. Thus the relay 62 is again energized and picks up its contactors. Closing of contactor 62E allows battery current to flow through the contactors 63E and 62E to the high speed winding H. Under these conditions, both the medium speed winding M and the high speed winding H are energized and 100% of the braking force is developed.

In a manner previously explained, inductive effect in the upper coil of relay 62 assists in assuring retention of the contactor 59H against the front contact. The transfer contact 63A functions to ensure that voltage induced in the winding of relay 62 will act on relay 58H rather than on relay 58L as was the case at the lower speed.

The above gives the general sequence of responses and is intended merely to outline the relationship of the various electric relay switches.

Assume now that a brake application is made with a car running above 65 miles per hour. When the speed falls below 65 miles per hour the reduction of current flowing through the winding of relay 58H causes the relay 58H to drop its contactor. The opening of contactor 59H deenergizes the relay 62 with the result that the contactor 62E opens to deenergize the high speed winding H leaving only the medium speed winding energized. Under these conditions, the braking force drops to 80%.

On further reduction of the speed past 40 miles per hour, the relay 58M drops its contactor 59M. This interrupts the circuit through the winding of relay 63 so that the latter drops its contactors with the result that 63E interrupts the circuit through the winding M. This conditions the pneumatic relay to establish 60% of the braking force.

On further reduction of speed past 20 miles per hour the relay 58L drops its contactor 59L. The effect is to interrupt the short circuit established around relay 62 which then picks up its contactors. The closing of the contactor 62D against the front contact energizes the low speed winding L with the result that the pneumatic relay develops 40% of the braking force.

It should be observed that the failure of the electric circuit or of the generator will deenergize all three windings L, M and H, in which event the pneumatic relay will operate at the 60% ratio.

From what has been said, it will be apparent that the pick up and drop off points for each of the speed responsive relays 58L, 58M and 58H are adjusted by adjusting the sliders on corresponding resistances 60M, 60L and 60H. This is a tedious operation and the present invention provides for the insertion of an adjustable master resistance 55 in the main generator circuit, in such a way that adjustment of the master resistance serves to displace the pick up and drop off points of all three speed responsive relays in approximately the same degree, at least within the limits of voltage variation occasioned by permissible changes of wheel diameter. Thus, the adjustable master resistance 55 is set in accordance with the actual diameter of the wheel 51. To facilitate this operation, the dial 71 is graduated in terms of wheel diameter (in inches). Against these graduations the pointer 72 on the resistor-adjusting knob 73 is read. The pointer 72 is set to the graduation of the dial 71 corresponding to the actual diameter of the wheel 51. When a new wheel of 36 inches in diameter is in use the adjustable resistance is set at very nearly zero. The maximum resistane is cut in when set for the minimum wheel diameter of 33 inches, because that corresponds to the highest rotary speed of the generator.

In a satisfactory installation using a 64 volt battery 69 (which is a storage battery charged from any suitable source) the relays 57, 58L, 58M and 58H were all 250 ohm relays with two windings. The resistors 60L, 60M and 60H were respectively of 1000, 2000 and 3000 ohms (maximum setting). The resistor 61 was 350 ohms, resistor 67 was 200 ohms and resistor 64 was 1500 ohms. The effect of the secondary speed relays 62, 63 is to shunt out a part of the resistance 60L, 60M or 60H to facilitate pick up, and restore it to facilitate the drop of the contactors 59L, 59M and 59H respectively and thus bring the pick up and drop points of each speed relay close together. There are thus six different values of resistance associated with the speed relays and modified by the adjustment of the master resistance. The modifications of pick up and drop points cannot be uniform, but can be made so nearly uniform as to be commercially acceptable. Actually commercial instruments used in testing the operation of the system show no significant variations.

I claim:

1. The combination of a wheeled vehicle; controllable braking means therefor; a plurality of controlling electric windings whose energization and deenergization control said braking means; an electric generator driven by a wheel of said vehicle, said wheel being subject to variations of diameter within permissible limits; a plurality of electric relays so arranged that they will respond individually to graduated values of generator speed and their contacts control the energization of said controlling windings; and a master resistance associated with the generator and adjustable to neutralize changes of generator speed occasioned by said permissible variation of wheel diameter.

2. The combination of a wheeled vehicle; controllable braking means therefor; a plurality of controlling electric windings whose energization and deenergization control said braking means; an electric generator driven by a wheel of said vehicle, said wheel being subject to variations of diameter within permissible limits; a plurality of electric relays so arranged that they will respond individually to graduated values of generator speed and their contacts control the energization of said controlling windings; resistance means for determining the responses of said relays; means for adjusting said resistance means; and a master resistance associated with the generator and adjustable to neutralize changes of generator speed occasioned by said permissible variation of wheel diameter.

3. The combination of a wheeled vehicle; controllable braking means therefor; a plurality of controlling electric windings whose energization and deenergization control said braking means; an electric generator driven by a wheel of said vehicle, said wheel being subject to variations of diameter within permissible limits; a plurality of electric relays so arranged that they will respond individually to graduated values of generator speed and their contacts control the energization of said controlling windings; resistance means for determining the responses of said relays; two independent adjusting means applied to said resistance means for independently adjusting the opening and closing action of each relay; and a master resistance associated with the generator and adjustable to neutralize changes of generator speed occasioned by said permissible variation of wheel diameter.

4. The combination of a wheeled vehicle; controllable braking means therefor; a plurality of controlling electric windings whose energization and deenergization control said braking means; an electric generator driven by a wheel of said vehicle, said wheel being subject to variations of diameter within permissible limits; a plurality of electric relays so arranged that they will respond individually to graduated values of generator speed and their contacts control the energization of said controlling windings; resistance means for determining the responses of said relays; a master resistance associated with the generator and adjustable to neutralize changes of generator speed occasioned by said permissible variation of wheel diameter; and reversing relay means serving to protect the electric relays from reversals of polarity occasioned by reversals of direction of travel of the vehicle.

5. The combination of a wheeled vehicle; controllable braking means therefor; a plurality of controlling electric windings whose energization and deenergization control said braking means; an electric generator driven by a wheel of said vehicle, said wheel being subject to variations of diameter within permissible limits; a plurality of electric relays so arranged that they will respond individually to graduated values of generator speed and their contacts control the energization of said controlling windings; a master resistance associated with the generator and adjustable to neutralize changes of generator speed occasioned by said permissible variation of wheel diameter; and means indicating the adjustment of said master resistance as a function of wheel diameter.

6. The combination of a wheeled vehicle; fluid pressure operated braking means therefor; a control pipe in which fluid pressures are developed to apply the brakes; a multiple ratio pneumatic relay interposed between said control pipe and said braking means; a plurality of controlling electric windings; means rendered effective by energization of selected windings to condition the pneumatic relay to establish different ratios between braking pressure and control pipe pressure; a generator driven by a wheel of the vehicle, said wheel being subject to variations of diameter within permissible limits; a plurality of electric relays so arranged that they are excited by said generator and their contacts control the energization of corresponding ones of said controlling windings; resistance means corresponding to respective relays, connected to modify the excitation of the windings thereof and thereby determine the potentials at which the respective relays function; and a master resistance interposed in the generator circuit and adjustable to neutralize the effect of changes of generator speed occasioned by permissible variations of wheel diameter.

7. The combination of a wheeled vehicle; fluid pressure operated braking means therefor; a control pipe in which fluid pressures are developed to apply the brakes; a multiple ratio pneumatic relay interposed between said control pipe and said braking means; a plurality of controlling electric windings; means rendered effective by energization of selected windings to condition the pneumatic relay to establish different ratios between braking pressure and control pipe pressure; a generator driven by a wheel of the vehicle, said wheel being subject to variations of diameter within permissible limits; a plurality of electric relays so arranged that they are excited by said generator and their contacts control the energization of corresponding ones of said controlling windings; resistance means corresponding to respective relays connected to modify the excitation of the windings thereof and thereby determine the potentials at which the respective relays function; a master resistance associated with the generator circuit and adjustable to neutralize the effect of changes of generator speed occasioned by permissible variations of wheel diameter; and means indicating the adjustment of said master resistance as a function of wheel diameter.

8. The combination of a wheeled vehicle; fluid pressure operated braking means therefor; a control pipe in which fluid pressures are developed to apply the brakes; a multiple ratio pneumatic relay interposed between said control pipe and said braking means; a plurality of controlling electric windings; means rendered effective by energization of selected windings to condition the pneumatic relay to establish different ratios between braking pressure and control pipe pressure; a generator driven by a wheel of the vehicle, said wheel being subject to variations of diameter within permissible limits; a plurality of electric relays so arranged that they are excited by said generator and their contacts control the energization of corresponding ones of said controlling windings; resistances in circuit with the windings of respective relays; means for adjusting each such resistance; relay controlled means for changing such resistance to differentiate the opening and closing action of said relays; adjustable means for determining the amount of such change; and a master resistance associated with the generator and adjustable to neutralize the effect of variations of generator speed occasioned by permissible variations of wheel diameter.

9. In combination a wheeled vehicle; controllable braking means for said vehicle; electric modulating means for modifying the intensity of response of said braking means; an electric generator driven by a wheel of said vehicle to supply current to said modulating means at potentials which vary with generator speed, said wheel being subject to variations of diameter within permissible limits; and a single manually adjustable means adapted to be set to neutralize, over the entire range of operation of the generator, the effect of changes in generator speed occasioned by said permissible variation of wheel diameter.

10. In combination a wheeled vehicle; controllable braking means for said vehicle; electric modulating means for modifying the intensity of response of said braking means; an electric generator driven by a wheel of said vehicle and having an output characteristic which varies with the diameter of said driving wheel, said wheel being subject to variation in diameter as an incident to use of the vehicle; and a single manually adjustable means for compensating, over the entire range of operation of the generator, for changes in the effective generator output characteristic occasioned by variations in wheel diameter.

ERWIN C. VROMAN.